(12) United States Patent
Lowe

(10) Patent No.: US 11,001,222 B2
(45) Date of Patent: May 11, 2021

(54) VEHICLE SAFETY DEVICES, SEAM TAPES FOR USE IN AIRBAG AND RELATED METHODS

(71) Applicant: Felters of South Carolina, LLC, Roebuck, SC (US)

(72) Inventor: Vernon J. Lowe, Greenback, TN (US)

(73) Assignee: FELTERS OF SOUTH CAROLINA, LLC, Roebuck, SC (US)

( * ) Notice: Subject to any disclaimer, the term of this patent is extended or adjusted under 35 U.S.C. 154(b) by 37 days.

(21) Appl. No.: 16/091,597

(22) PCT Filed: Apr. 5, 2017

(86) PCT No.: PCT/US2017/026162
§ 371 (c)(1),
(2) Date: Oct. 5, 2018

(87) PCT Pub. No.: WO2017/176892
PCT Pub. Date: Oct. 12, 2017

(65) Prior Publication Data
US 2019/0084519 A1 Mar. 21, 2019

Related U.S. Application Data

(60) Provisional application No. 62/318,305, filed on Apr. 5, 2016, provisional application No. 62/318,408, filed on Apr. 5, 2016.

(51) Int. Cl.
*B60R 21/235* (2006.01)

(52) U.S. Cl.
CPC .. *B60R 21/235* (2013.01); *B60R 2021/23576* (2013.01); *B60R 2021/23595* (2013.01)

(58) Field of Classification Search
CPC ........ B60R 21/235; B60R 2021/23595; B60R 2021/23576
See application file for complete search history.

(56) References Cited

U.S. PATENT DOCUMENTS 5,685,561 A    11/1997  Kauer
6,458,725 B1 * 10/2002  Masuda ............... B60R 21/235
                                                              280/728.1
(Continued)

FOREIGN PATENT DOCUMENTS

DE    102012019945 A1 *  4/2013  ........... B60R 21/235
EP        3127584 A1      2/2017

OTHER PUBLICATIONS

International Search Report and Written Opinion for International Application No. PCT/US2017/026162 dated Sep. 6, 2017.

*Primary Examiner* — Darlene P Condra
(74) *Attorney, Agent, or Firm* — J. Bennett Mullinax, LLC

(57) ABSTRACT

Vehicle safety devices, seam tapes for use in safety airbags along with their methods of formation and use are provided. The vehicle safety device can comprise an airbag and a pyrotechnic device positioned within working proximity to an aperture defined in the airbag and configured to fill the interior space of the airbag with a gas upon ignition. The vehicle safety device can also comprise a seam tape positioned over the seam joining a first fabric section and a second fabric section of the airbag. The seam tape can be configured to melt enough to flow into the needle puncture holes formed along the seam upon ignition of the pyrotechnic device.

23 Claims, 6 Drawing Sheets

(56) References Cited

U.S. PATENT DOCUMENTS

| | | | |
|---|---|---|---|
| 6,630,220 B1 | 10/2003 | Veiga | |
| 6,797,654 B2 * | 9/2004 | Lodde | D04H 1/435 442/151 |
| 7,681,917 B2 | 3/2010 | Guillo et al. | |
| 2002/0056979 A1 * | 5/2002 | Baker | B29C 65/04 280/743.2 |
| 2005/0263345 A1 * | 12/2005 | Erickson | B60R 13/0815 181/290 |
| 2013/0089725 A1 * | 4/2013 | Jung | D01F 6/62 428/221 |
| 2013/0309479 A1 * | 11/2013 | Kim | D01F 6/62 428/221 |
| 2015/0308019 A1 * | 10/2015 | Kim | D02G 3/46 57/255 |
| 2015/0321637 A1 * | 11/2015 | Lowe | B60R 21/235 280/741 |
| 2016/0137154 A1 * | 5/2016 | Sasu | B60R 21/2165 280/728.3 |
| 2017/0137976 A1 * | 5/2017 | Youn | D01F 6/62 |
| 2017/0174949 A1 * | 6/2017 | Todaka | C09J 133/00 |

* cited by examiner

VEHICLE SAFETY DEVICES, SEAM TAPES FOR USE IN AIRBAG AND RELATED METHODS

RELATED APPLICATION

The presently disclosed subject matter claims the benefit of U.S. Provisional Patent Application Ser. No. 62/318,305, filed Apr. 5, 2016, and U.S. Provisional Patent Application Ser. No. 62/318,408, filed Apr. 5, 2016, the both disclosures of which are incorporated herein by reference in their entireties.

TECHNICAL FIELD

The present subject matter relates to seam tapes used in airbags and related safety devices that use the seam, tapes as well as related methods. In particular, the present subject matter relates to seam tapes that are positioned along seams in associated airbags that are configured to at least partially melt and seal needle puncture holes in the airbags along the seams.

BACKGROUND

An airbag is a vehicle safety device that generally includes a flexible envelope (e.g., a nylon fabric) designed to inflate rapidly during an automobile collision. The airbag's purpose is to cushion occupants during a crash and provide protection to their bodies when they strike interior objects such as the steering wheel or a window. Vehicles may contain multiple airbags in various side and/or frontal locations of the passenger seating positions, and sensors may deploy one or more airbags in an impact zone at variable rates based on the type and the severity of impact.

Most airbag designs are inflated by the ignition of a gas generator propellant via a pyrotechnic device to rapidly inflate the flexible envelope. The pyrotechnic device can generally include an electrical conductor wrapped in a combustible material and can activate quickly (e.g., less than 2 milliseconds) with a current pulse (e.g., of about 1 to about 3 amperes). When the conductor becomes hot enough, it ignites the combustible material (e.g., a solid propellant), which initiates the gas generator. The burning propellant generates inert gas which rapidly inflates the airbag (e.g., typical rate of inflation in current technology is about 20 to about 30 milliseconds).

These hot gases and hot particulates are particularly concentrated in the area within the airbag proximate to the pyrotechnic device. As, a solution, attempts have been made to include a sacrificial fabric within the airbag in the area proximate to the pyrotechnic device to help protect the airbag fabric. In use, this sacrificial fabric is burnt by the hot gas and/or hot particulates. However, due to the need to ensure that the sacrificial layer can sufficiently protect the airbag fabric, multiple layers of the sacrificial layer is included (either unbonded or as a laminate) within the device dependent upon the combustion temperature required Thus, these sacrificial heat shield fabrics add significant thickness and complexity to the construction of the airbag, device.

In addition to this primary heat shield, the complete air bag cushion structure needs to resist tearing and/or penetration during the virtually instantaneous inflation of the device. The cushion structure is typically made up of a series of cut pieces of woven nylon fabric that are then sewn together to create an enclosure or envelope that, when activated by a pyrotechnic device, fills with hot inert gas to form a relatively deformable gas filled structure between the vehicle occupant and the hard surfaces of the vehicle. Where the fabric sections are sewn together to create the cushion, a reinforcement strip of woven nylon material 35 mm wide is typically sewn over the joint to provide a structural tie between the two sewn fabric components and also to provide a secondary gas seal when the air bag is activated.

The panels of fabric that comprise the airbag cushion, or envelope, are best held together by sewing them together. Likewise, the attachment of the reinforcement strips to the airbag cushion is best performed through sewing. The needle puncture holes at the seams of the airbags formed where the nylon panels of the airbag are sewn and, in embodiments, where the reinforcement strip is sewn to the airbag also create leakage points within the airbag cushion that allow the inert gas filling the airbag cushion to leak from the airbag cushion structure while it is filling. This leakage slows the deployment of the airbag cushion. Due to the nature of the cause for deployment of an airbag cushion within a vehicle, i.e., a vehicular crash, every additional millisecond that it takes an airbag cushion to deploy can have an impact on the effectiveness of that airbag cushion to reduce injury to a passenger or drive in the crashing vehicle.

As such a need exists for vehicle safety devices, such as airbag cushions, that can more effectively deploy within a crashing vehicle as well as components that can be used in facilitating the increase in the effective deployment of such vehicle safety devices.

SUMMARY

The present subject matter provides seam tapes used in airbags and related safety devices that use the seam tapes as well as related methods. In, particular, the present subject matter relates to seam tapes that can be positioned along seams in associated airbags that are configured to at least partially melt and seal needle puncture holes in the airbags along the seams. Methods related to the manufacture and use of the seam tapes and related vehicle safety devices as disclosed herein are also provided.

Thus, it is an object of the presently disclosed subject matter to provide seam tapes for used in airbags and related vehicle, safety devices as well as methods related thereto. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1:
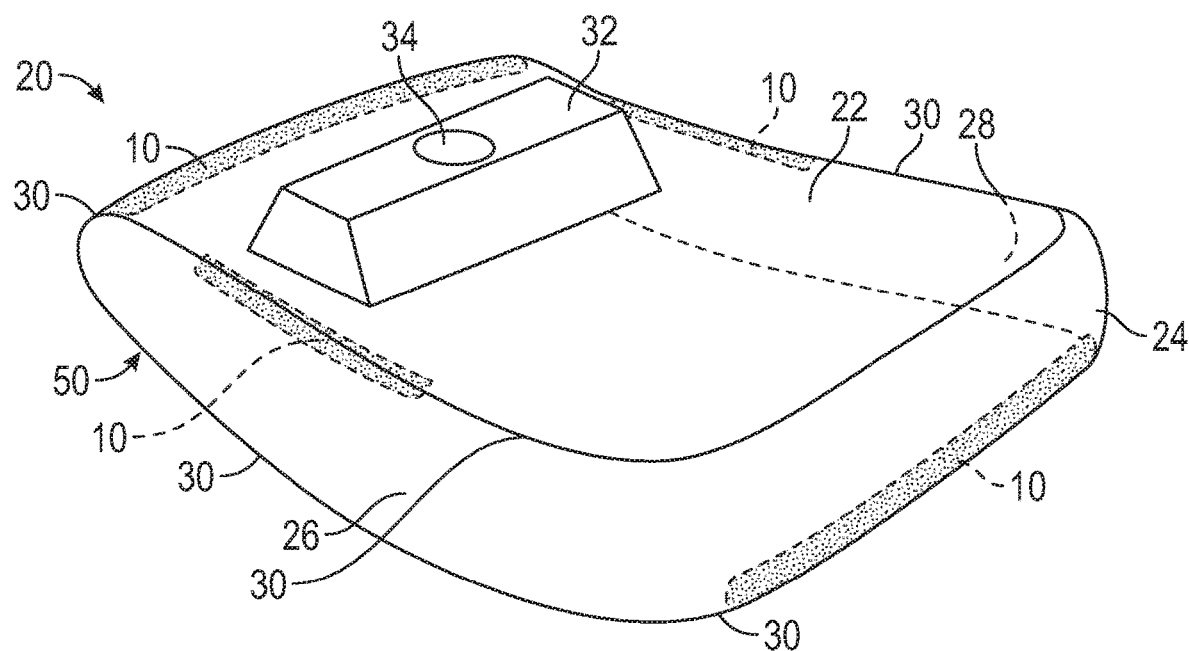
FIGS. 1-6 illustrate perspective views of an embodiment of a vehicle safety device that comprises seam tape positioned along at least a portion of seams of an airbag cushion of the vehicle safety device as the airbag cushion is folded for installation according to the present subject matter.
Figure 2:
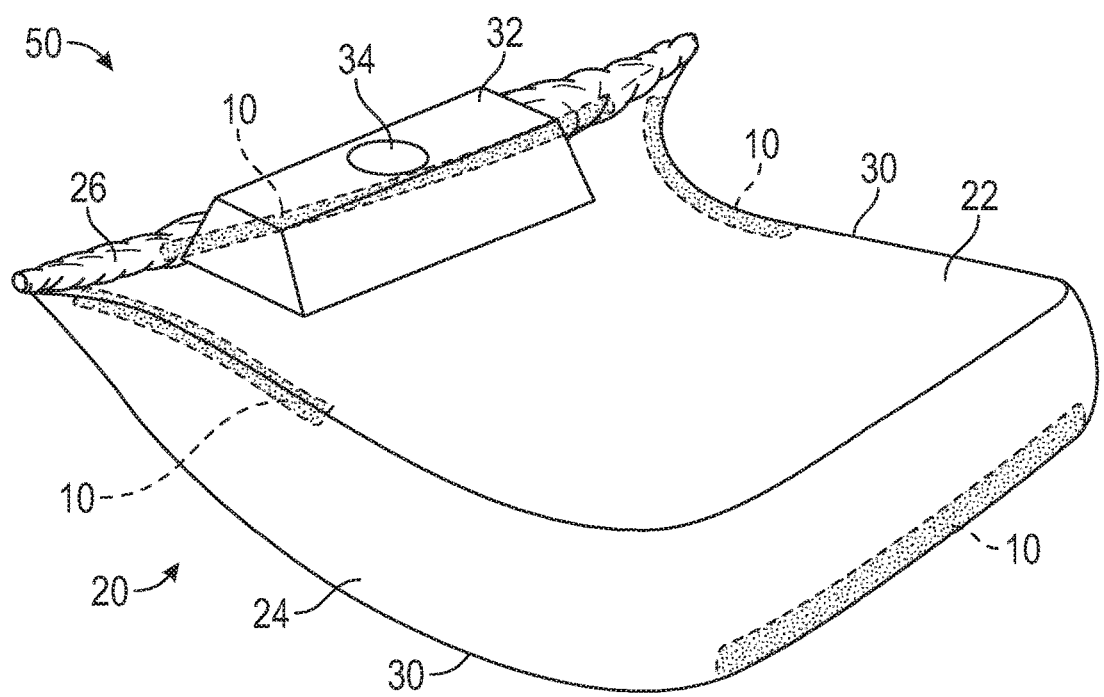
Figure 3:
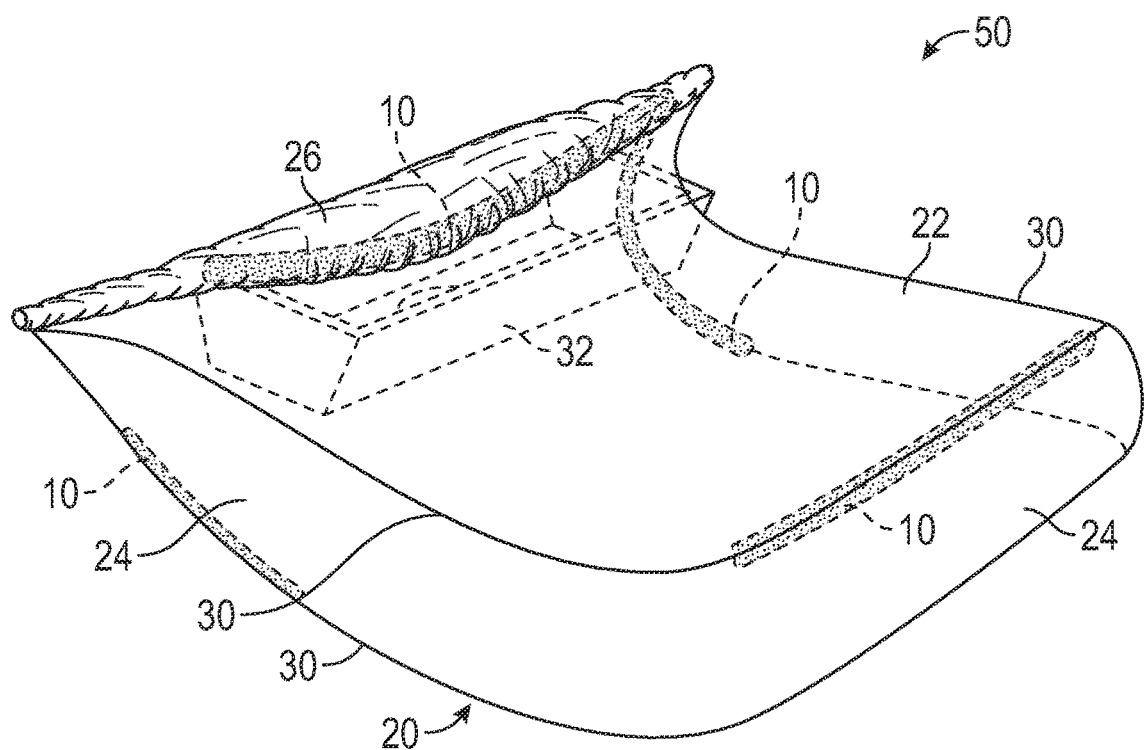
Figure 4:
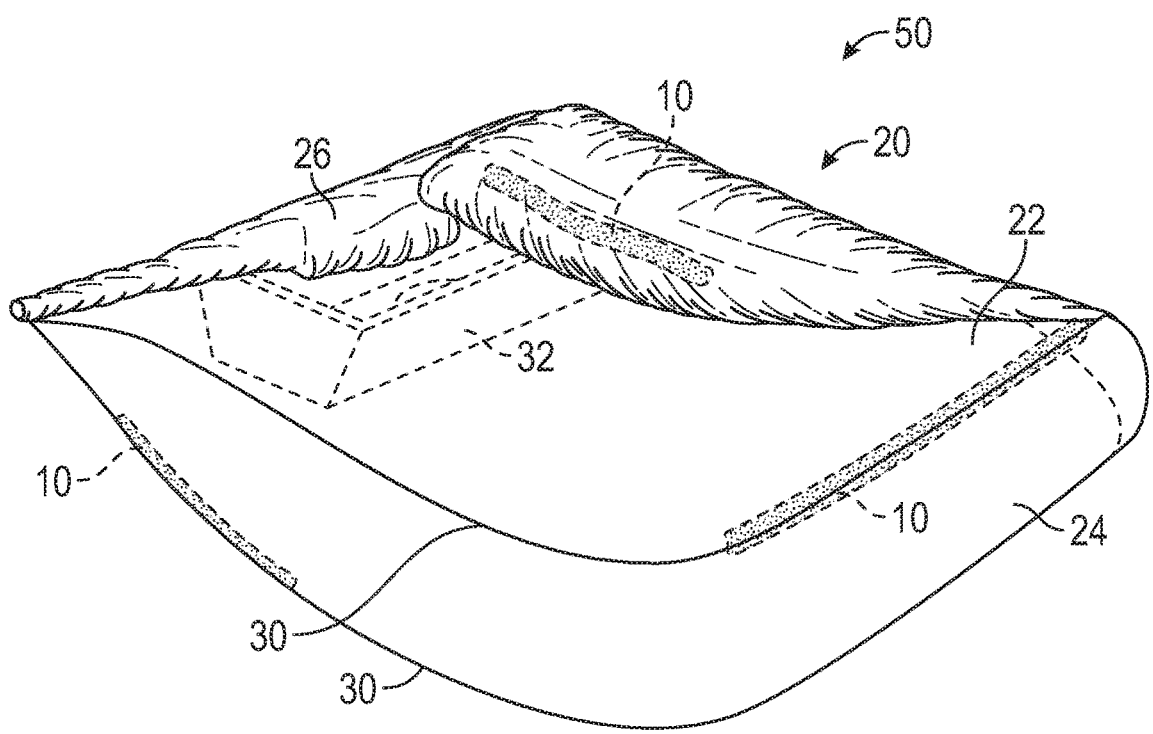
Figure 5:
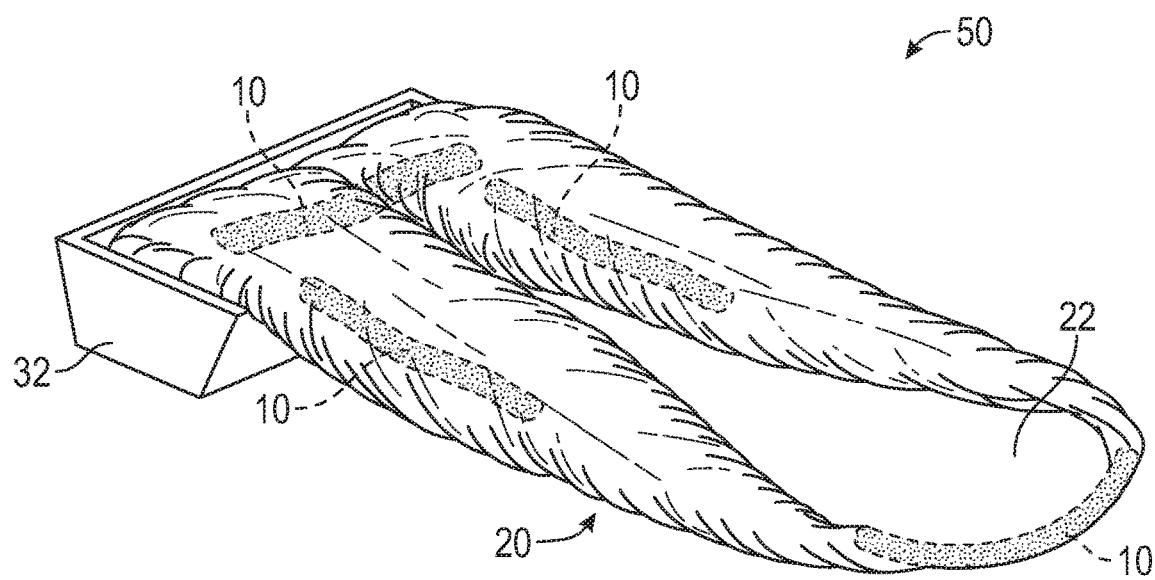
Figure 6:
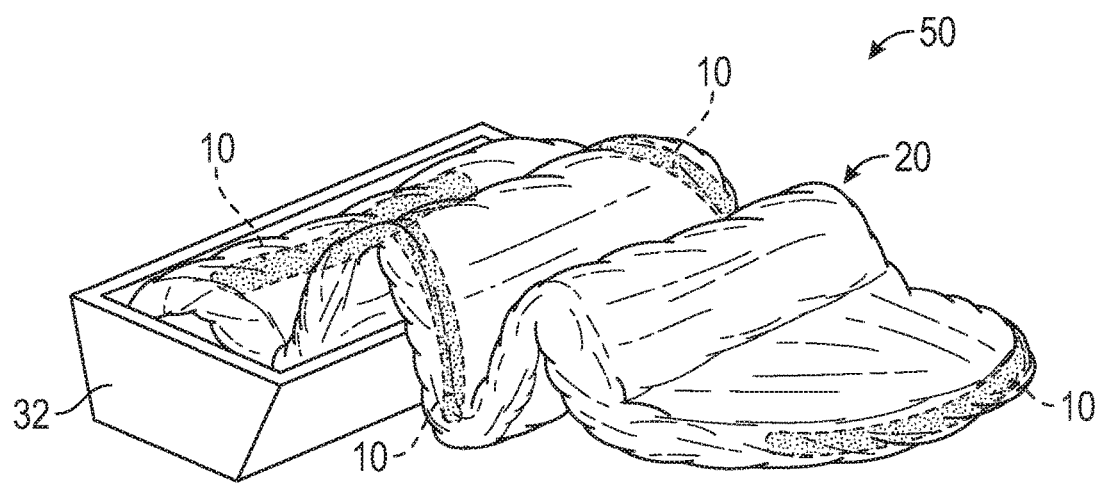

Repeat use of reference characters in the present specification and drawings is intended to represent the seam or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended, that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, top, bottom, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, when a feature or element is being described in the present disclosure as "on" or "over" another feature or element, it is to be understood, that the features or elements can either be directly contacting each, other or have another feature or element between them, unless expressly stated to the contrary. Thus, these terms are simply describing the relative position of the features or elements to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes, and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of the subject matter and are not necessarily intended to limit the scope of the subject matter disclosed herein unless it specifically stated otherwise herein.

It is to be understood that the ranges and, limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

As used herein, the terms "airbag," "airbag cushion," and "air cushion" are used interchangeably. Similarly, as used herein, the terms "fabric sections" and "fabric panels" are used interchangeably Although it is difficult to generalize, the shape of the cushion can normally be achieved by using rectangular and triangular components. These shaped components can allow for a higher nesting efficiency when folded, as well as a reduction in material scrap. A normal air cushion can include roughly 4 meters of sewn, seam. Some of this seam may beneficially include woven and knitted nylon reinforcement. Some seams adjacent to or directly in line with an exit of inflation gas that is fired from a pyrotechnic device to inflate the air cushion may also include one or more textile materials, such as nonwoven materials, to aid in the inflation of the air cushion as described further below. This textile material can provide an added protection and can be, for example, at approximately 1 meter in length.

The present subject matter discloses seam tapes that can be used to seal needle puncture holes in airbag cushions (hereinafter "airbags") used as vehicle safety devices constructed of fabric panels where the panels of the airbags are sewn together to form seams. The seam tape can be placed along the seams of the airbag after the panels have been sewn together to form the airbag. In some embodiments, the seam tape can also be place between reinforcements strips used to help provide added strength along the seams of airbags. In some embodiments, the seam tape can be sewn together with the panels and/or the reinforcement strips in a single step of an airbag formation process. Examples of reinforcement strips that can be used within the airbag as described herein are disclosed in U.S. patent application Ser. No. 14/658,883, which, is incorporated by reference in its entirety.

Alternatively, the panels of the airbag can be sewn together to from the seams and then the seam tape can be attached inside the airbag and over top of the seams of the airbag. Similarly, the panels of the airbag can be sewn together to from the seams and then the reinforcement strips and the seam tape can be attached inside the airbag and over top of the seams of the airbag with the seam tape being between the reinforcement strips and the seams of the airbag. The seam tape can comprise thermoplastic polymer fibers or yarns. In some embodiments, the seam tape can be used on all the seams within an airbag. In some embodiments, the seam tape can be used along selective seams in the airbag. For example, the seam tape can be used along selective seams in the airbag that will experience the greatest force and heat from the inert gas during inflation of the airbag.

Once the airbags are folded into the envelope and installed for use, during deployment in a crash, the heat generated by the pyrotechnic device that provides the inert gas at a high rate of speed to inflate the airbag also creates a high temperature which can cause the thermoplastic polymers of the seam tape to melt. This melted seam tape can then be forced by the inert gas to seep into the needle puncture holes to close the needle puncture holes formed by sewing of the seams and/or attaching the reinforcement strip within the airbag. Without wishing to be bound by any particular theory, it is believed that, by sealing the needle puncture holes, the airbag can inflate more quickly since the needle puncture holes provide a leakage point for the air generated to deploy the airbags. Thereby, the airbag can inflate more quickly through the use of the seam tape at critical points along the seams of the airbags used within vehicles. While the heat generated at the initiation of the deployment of the airbag by the pyrotechnic device is very hot initially, it quickly cools. The seam tape can comprise a polymer fiber or light yarn which allows it to melt and be pushed by the generated gas into the needle puncture holes caused by the sewing of the seams and/or reinforcement strips.

During deployment, the nitrogen inflator gas enters the cushion at approximately a velocity of about Mach 1.2 to 1.4 and a temperature of around 700 to 750° C. The velocity and temperature of the inflator gas and transported particles of the melted seam tape down the woven nylon sewn seam holes to seal much of the space around the seam (needle puncture) holes in the nylon cushion envelope, i.e., the airbag. Thus, both the velocity and the temperature of the inflation gas can facilitate the melting of the polymer of the seam tape and the sealing of the voids within the air cushion.

The seam tape can, for example, comprise a knitted, woven, or nonwoven material which has properties that allow the seam tape to melt and flow into the needle puncture holes during deployment of the airbag. For example, the yarn size or fiber size used within the knitted, woven or nonwoven seam tape is of a size that allows it to melt during the quick and intense heat flash caused by the ignition of the pyrotechnic device that inflates the airbag. As stated, the yarns or fibers of the seam tape can comprise a thermoplastic polymer or a blend of thermoplastic polymers. For example, polyesters, polyamides, polypropylenes, polyethylenes, acrylics, polyolefins, or the like, or combination thereof, can be used as the polymer or polymers within the seam tape in some embodiments and can depend on such factors that include, but are not limited to, the melt temperature of the polymers, the size of the fibers and/or yarns used in the seam tape, the fabric used in the airbag cushion, the temperature of the inflation gas upon inflation of the air cushion, and the velocity of the inflation upon inflation of the airbag cushion.

In some embodiments, the seam tape can comprise a nonwoven material. For example, the nonwoven material can comprise a spunbonded nonwoven, a meltblown nonwoven, a needlepunched nonwoven, a point-bonded nonwoven, a stitchbonded nonwoven or the like. Depending on various factors, the size of the fibers used in such nonwovens can vary. The denier and the length of the fiber use within the nonwovens can be dependent upon the type of nonwoven use, the melting point and glass transition point of the respect of polymers, and the length of time of exposure to extreme heat and the amount of heat to which the fibers are exposed. In, some embodiments, the fibers can have a denier of between about two (2) and about fifteen (15). In some embodiments, the fibers can have a denier of between about three (3) and about twelve (12). In some embodiments, the fibers can have a denier of between about six (6) and about twelve (12). In some embodiments, the fibers can have a denier of between about two (2) and about ten (10). In some embodiments, the fibers can have a denier of between about three (3) and about five (5). In some embodiments that use staple fibers within the nonwoven, the fibers can have a length of about 1½ inches to about 6 inches. In some embodiments that use staple fibers within the nonwoven, the fibers can have a length of about 2 inches to about 5 inches. In some embodiments that use staple fibers within the nonwoven, the fibers can have a length of about 2½ inches to about 4 inches. For example, in some embodiments that use staple fibers within the nonwoven, the fibers can have a length of about 2 inches, about 2½ (2.5) inches, and/or about 3 inches. In some embodiments the fibers can be crimped. The crimping of the fibers and the length of the fibers can facilitate the entanglement of the fibers while permitting the high temperature, supersonic gas to liquefy the polymer and transport it to the sew holes.

The fiber denier, fiber length and fiber crimp can be determined based on the ability of the fibers to melt and liquefy quickly when exposed to the heat of an inflation gas that inflates the airbag cushion while providing a nonwoven that has the structural integrity to permit the nonwoven to be feed under the needle of a sewing machine to permit high speed sewing to occur. It has been found that, in nonwoven seam tape embodiments that have an adequately structural integrity, small denier and short staple length fibers can be useful in providing a nonwoven that is easier to melt and liquefy. The crimp of the fiber can improve structural integrity of a needlepunched nonwoven seam tape by improving the entanglement of the fibers during the needling process. A higher degree of crimping of the fibers can increase the structural integrity of needlepunched nonwoven seam tape. Thus, the type of polymer fibers used in the seam tape, the fibers denier and length, and the thickness of the seam tape can depend on the velocity and the temperature of the inflation gas. The polymer fibers should also be of a composition and size that they melt before the fabric of the airbag cushion. These factors can be selected based on an understanding of that the velocity and the temperature of the inflation gas can facilitate the melting of the polymer of the seam tape and the sealing of the voids within the airbag cushion.

Various polymer fiber deniers, fiber lengths, and blend of polymer fibers can be used to determine the optimum fiber combination. Additionally, the type of bonding used, whether melt-bonded, spunbonded, point-bonded, stitch-bonded, needlepunched, or the like, can be determined depending on the various factors that can influence the polymers ability to melt, flow, and reside in the needle puncture holes within the airbag that are formed along the seams. For example, the needle constituent used to form a needlepunched nonwoven can vary. Similarly, the frequency, size and spacing of point bonds within a point-bonded nonwoven can vary. While a point-bonded nonwoven can be used as a seam tape, a needlepunched nonwoven seam tape can have the advantage of melting quicker than a point-bonded nonwoven seam tape when exposed to the high temperatures of inflation gas to fill the holes of the stitchings along the seams of the air cushion more quickly. Thereby, a needlepunched nonwoven seam tape, depending on the size and composition of the fibers therein, can tend to seal the seams fast and better than a point-bonded nonwoven seam tape, Other factors which can be taken into consideration in determining the polymer or blends of polymers used within the seam tape can include optimum tape swing speed and maximum tape integrity that can be obtained while providing the polymer fiber combustion/melting to seal gas leaks through the structural sewn needle holes. Without wishing to be bound by any particular theory, it is believed that up to a 3% improvement in inflation time with a low cost nonwoven seam tape can be obtained through the use of the seam tape covering the seams of an airbag cushion envelope.

In some embodiments, the seam tape can comprise a needlepunched nonwoven material of a thermoplastic polymer which has a melting point and fiber size that allows it to not only soften, but to melt and flow so that the melted polymer flows into the needle puncture holes within the airbags with the ignition of the pyrotechnic device and the generation of the inert gas. At the same time, the gas cools quickly enough so that the melted polymer begins to harden within the needle puncture holes as the airbag inflates. In such embodiments, a needlepunched nonwoven seam tape can be calendered, for example, in an S-typed calender machine, so that one side of the seam tape can form a greater number and stronger bonds due to the calendering from the heat and pressure applied to the one side as compared to the heat and pressure applied to the other side of the seam tape during the calendering. The calendering of the needlepunched nonwoven seam tape can also aid in the sewing of the seam tape. The side of the needlepunched nonwoven with fewer bonds formed by calendering can face toward, and be proximate to, the seams of the airbag with the side of the needlepunched nonwoven with more bonds formed by the calendering can face away, and be distal from, the seams of the airbag. For example, in some embodiments, the side of the needlepunched nonwoven with fewer bonds formed by calendering can reside on the seams of the airbag when being placed between the seams of the airbag and the reinforcement strips. Without wishing to be bound by any particular theory, it is believed that the more heavily calendered side of the nonwoven adds an integrity to allow securement to the seam tape and the airbag during a sewing operation while the less calendered side of a nonwoven seam tape can face a seam in the airbag and provide less structure so that more overall surface area of polymer is provided to allow for a faster and more thorough melting of the polymer upon firing of the pyrotechnic device within the airbag.

The purpose of the seam tape is to stop the erosion that occurs around the seam holes, especially in the regions of the airbag cushion exposed to more inflation gas heat. The impingent gas shock wave can erode the cushion fabric, such as a nylon fabric, around the needle seam holes, which can sometimes result in the cushion bursting open. Any kind of opening/bursting of the cushion can cause the airbag cushion to improperly inflate or fail to inflated, which, in turn, causes the airbag cushion to fail to operate properly as intended. Airbag cushion manufacturer have recently implemented a sacrificial stitch in an effort to combat this seam bursting issue. Within 15 to 20 milliseconds of the initiation the high velocity, high heat of the gas breaks the sacrificial stitch and peels the folded cushion open. Ideally, with the introduction of the seam tape such cushions may have, but will not require, the sacrificial stitch. Instead, the seam tape can absorb the shock with the polymer melting and flowing down the sewn cushion holes, which can improve and/or reduce inflation gas fill time.

Referring to FIGS. 1-6, an example of how an embodiment of a seam tape 10 can be used within, an airbag cushion, generally designated 20 is provided. In particular, a vehicle safety device, generally designated 50, is provide that can comprise the airbag cushion 30 and an inflation casing 32 in which the airbag cushion 20 is folded in specific folds and in which a pyrotechnic device (not shown) is also inserted. The vehicle safety device 50 as shown in FIGS. 1-6 is for a driver side airbag cushion 20 that is to be installed in a steering wheel of a vehicle. Airbag cushion 20 can comprise fabric panels 22, 24, 26, 28, for example, that are sewn together along seams 30. The airbag cushion 20 of the vehicle safety device 50 can be attached to the inflation casing 32 which can include an aperture 34 therein for housing the pyrotechnic device. In particular, a pyrotechnic device can be inserted into the pyrotechnic aperture 34.

In some embodiments, the seam tape 10 can be placed around all of the seams 30 in the airbag, cushion 20. In the embodiment shown, the seam tape 10 is placed on selective portions of the seams 30 that are likely to receive the greatest stress from the ignition of the pyrotechnic device and the generated gas. In particular, the selection of the placement of the seam tape 10 on the seams 30 of the airbag cushion 20 in the embodiment shown in FIGS. 1-6 can be on the portions of the seams 30 that are exposed to the greatest pressure and stress that the folded air cushion 20 inserted into the inflation casing 32 experiences when the pyrotechnic device is ignited. FIGS. 1-6 illustrate the different specific folds in which the driver side front airbag cushion 20 is folded to create the cushion envelope stored within the inflation casing 32. As can be seen, the seam tape 10 can be secured to the airbag cushion 20 at specific locations along the seams 30 where the inert gas expands the airbag cushion 20 with the greatest force on the seams 30. In some embodiments, such locations for the seam tape on the seams when the airbag cushion 20 is folded can be adjacent the hot gas generated upon ignition of the pyrotechnic device. For example, the seam tape 10 can be secured on a the seams 30 on the front bottom portion of airbag cushion 20 and along the seams 30 on either side of the top portion of airbag cushion 20 Further, the seam tape 10 can be secured on the seams 30 of a rear top portion of airbag cushion 20.

The seam tape 10, for example, can comprise a nonwoven comprising thermoplastic polymer fibers. For example, in some embodiments, the seam tape 10 can comprise a needlepunched nonwoven of polyester fibers that can have length of between about 2 inches and about 3 inches, such as about 2½ inches. Further, the polyester fibers can have a denier of about three (3). In some embodiments, the seam tape 10 can comprise a needlepunched nonwoven of a blend of thermoplastic polymer fibers. For example, in one specific embodiment, the seam tape 10 can comprise a needlepunched nonwoven of about 80% polyester fibers that can have length of between about 2½ inches and a denier of about three (3) and about 20% polypropylene fibers that can have a length of about 2 inches and a denier of about five (5). The needlepunched nonwoven can be processed through an S-type calender machine to provide different levels of bonding and finishing on the opposing sides of the seam tape 10.

When the vehicle safety device 50 is deployed during a crash, the pyrotechnic device ignites and the inert gas forcefully fills the airbag cushion 20. During this process, the heat in the inert gas from the firing of the pyrotechnic device is so intense that the polymer fibers of the needlepunched nonwoven seam tape 10 can melt. As the inert gas fills the airbag cushion 20, the gas can force the melted polymer into the needle puncture holes along the seams 30 of the airbag cushion 20. In this manner, the leakage of gas through the needle puncture holes of the seams 30 where the seam tape 10 is placed can be reduced and/or prevented.

Figure 7:
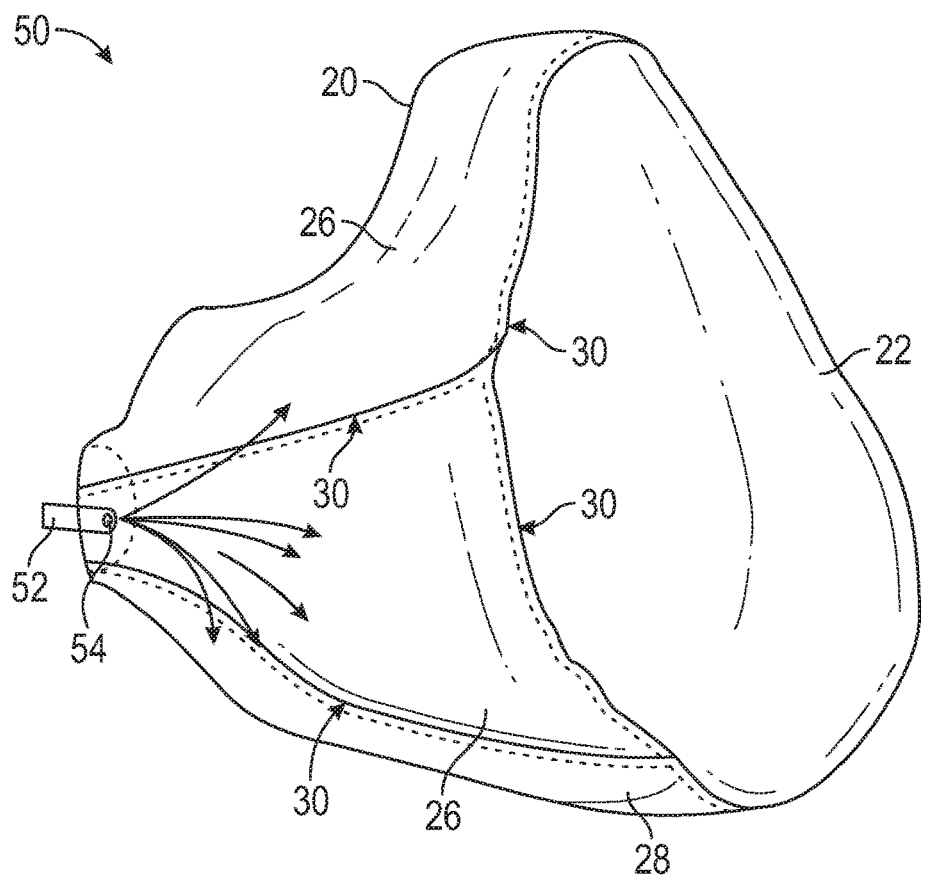
FIG. 7 illustrates a perspective view of another embodiment of a vehicle safety device that comprises seam tape positioned along at least a portion of seams of an airbag cushion of the vehicle safety device according to the present subject matter.

As shown in FIG. 7, another embodiment of a vehicle safety device 50 is generally provided that can include an airbag cushion 20 and a pyrotechnic device 52. Generally, the airbag cushion 20 forms an interior space and defines an aperture 14 in which the pyrotechnic device 52 can be positioned within working proximity. The pyrotechnic device 52 is configured to fill the interior space of the airbag cushion 20 with a gas upon ignition. In the embodiment shown, airbag cushion 20 can be formed from a plurality of fabric sections, or panels, 22, 24, 26, 28. As an example, the airbag cushion 20 is shown formed from a first fabric section 22, a second fabric section 24, a third fabric section 26, and a fourth fabric section 28. It is noted that any number of fabric sections may be joined together to form the airbag, cushion 20.

As example, the thread used as the stitching in the assembly of an airbag cushion can be a polymer thread or yarn. For example, the most commonly used thread for assembly of the airbag cushion is nylon 6,6 with a 1.4 mm diameter needle. Polyester thread can also be used, but manufacturers do not usually use polyester thread. For example, in some embodiments, the nylon thread can be a T90-4 ply that comprises 4×235 dtex yarns or continuous filament fibers twisted together. In some embodiments, the nylon thread can comprise 3×470 dtex yarns or continuous filament fibers twisted together. In some embodiments, a nylon thread can be used that comprises T69-3 ply, which comprises 3×235 dtex yarns or continuous filament fibers twisted that is normally used for lock stitching around the holes. Currently, manufacturers tend to use a 6 mm gauge between the needles holes. It was noted that the more stitches used to bind the portions of the airbag cushion together creates more perforations that can make it is easier to tear. Alternatively, too few stitches can make the stitches pop, or break, under stress. A common standard currently being used can be 35 stitches per 100 mm of seam tape. In some embodiments, 25 to 45 stitches per 100 mm of seam tape can be used. The seam tape can provide some protection to the actual seam to allow for a lower stitch count per 100 mm.

Figure 8A:
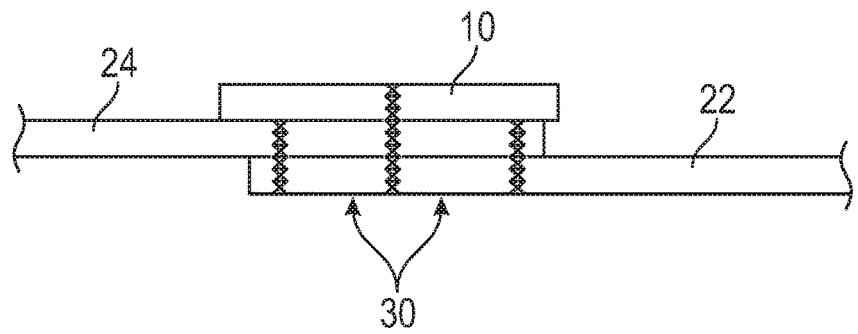
FIG. 8A illustrates a cross-sectional view of an embodiment of a seam tape that can be used along an embodiment of a seam within the airbag cushion of the vehicle safety device according to FIG. 7.
Figure 8B:
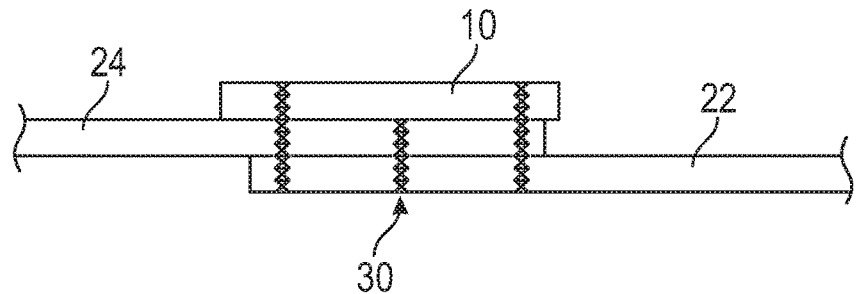
FIG. 8B illustrates a cross-sectional view of another embodiment of a seam tape that can be used along an embodiment of another seam within the airbag cushion of the vehicle safety device according to FIG. 7.

Each fabric section 22, 24, 26, 28 can be joined to an adjacent fabric section 22, 24, 26, 28 via a seam 30. As discussed in greater detail below, the seam 30 can be formed from a single stitching (e.g., as shown in FIG. 8B), a double stitching (e.g., as shown in FIG. 8A), or other multiple stitchings. The seam can be a variety of types of seams including, but not limited to a shear seam, top-stitching and folded seam, a peel seam, or the like. Similarly, in some embodiments, a seam tape 10 can be stitched to fabric sections(s) 22, 24, 26, 28, with at least one additional reinforcement stitching, in proximity to at least a portion of the seams 30. Due to the positioning of the seam tape 10 on the inner surface of the airbag cushion 20 along at least a portion of the seams 30, the stitching(s) that connect the fabric sections 22, 24, 26, 28 together and the associated needle puncture holes can be at least partially sealed by the melting of the polymer fibers in the seam tape 10 by the high temperature gas and/or particles released upon ignition of the pyrotechnic device 54 when inflating the airbag 10 via the aperture 54.

In both embodiments shown in FIG. 8A, the first fabric panel 22 is overlapped with the second fabric panel 24 to define an overlap area, with the seam 30 being located within the overlap area to join the fabric panels together. In order to increase the coverage provided by the seam tape 10 along the seam 30, the seam tape 10 can haves a width that extends beyond the overlap area of the panels 22, 24. As shown in FIG. 8A, the seam 30 can comprise a double stitching and the seam tape 10 can be secured by a single stitching. In some embodiments, the seam tape 10 can be secured over the seam 30 by other securement mechanisms. In the embodiment shown in FIG. 8A, the stitching used to secure the seam tape 10 to the first fabric panel 22 and the second fabric panel 24 is a single stitching, but it is understood that multiple securement stitchings may be utilized as desired.

FIG. 8B shows another embodiment of a seam 30 formed between the first fabric panel 22 and the second fabric panel 24. The first fabric panel 22 and the second fabric panel 24 can be joined via a single stitching to form the seam 30. The seam tape 10 can have a width that extends up to and/or beyond stitching joining the first fabric panel 22 and the second fabric panel 24. In the embodiment shown, the seam tape 10 can be secured to the first fabric panel 22 and the second fabric panel 24 by a double stitching. In the embodiment shown, the stitching, used to secure the seam tape 10 to the first fabric panel 22 and the second fabric panel 24 is a double stitching, but it is understood that a different number of securement stitchings may be utilized as desired to either secure the panels 22, 24 and/or the seam tape 10.

Figure 9A:
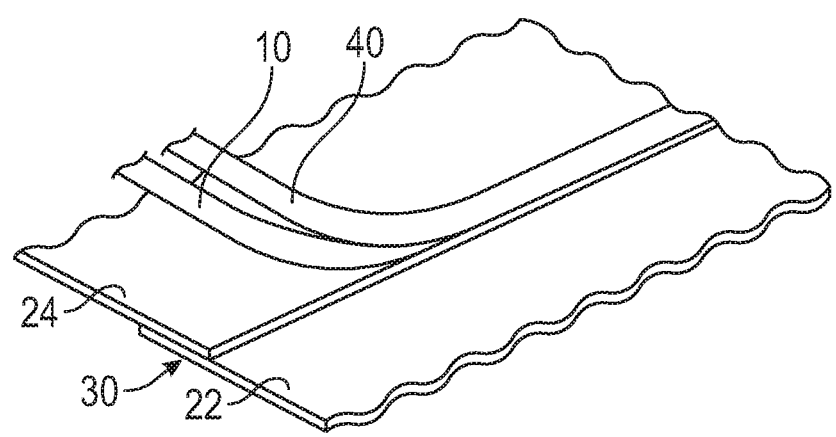
FIG. 9A illustrates a perspective view of a further embodiment of a seam tape and a reinforcement strip that can be used along an embodiment of a seam within an airbag cushion of a vehicle safety device according to the present subject matter.
Figure 9B:
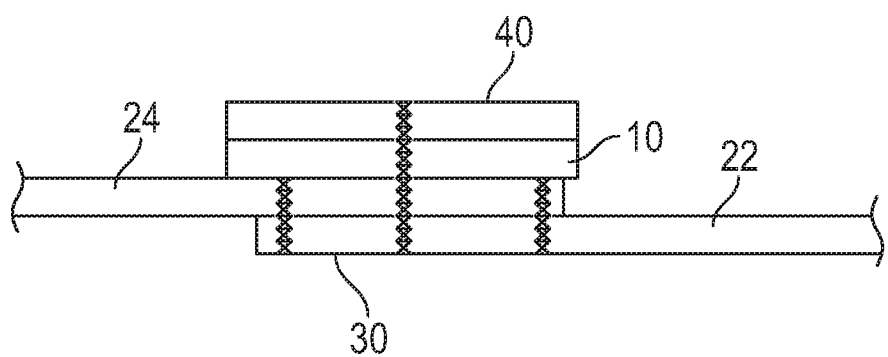
FIG. 9B illustrates a cross-sectional, view of the embodiment of the seam tape and the reinforcement strip used along the embodiment of the seam within the airbag cushion of the vehicle safety device according to FIG. 9A.

FIG. 9A illustrates a process of making another embodiment of an airbag cushion 20 for use within a vehicle safety device 50 as shown in FIG. 1-7. In some embodiments as shown in FIG. 9A, a seam 30 can be formed between the first fabric panel 22 and the second fabric panel 24. A seam tape 10 can be positioned between the seam 30 and a reinforcement strip 40. As shown in FIG. 9B, the reinforcement strip 40 and the seam tape 10 can be secured to the both the first fabric panel 22 and the second fabric panel 24. The stitching configurations of the various components can vary. Due to positioning of the reinforcement strip 40 as the exposed interior surface along the seam 30 of an airbag cushion 20, the stitching(s) that connect the fabric sections 12 together can be protected from the high temperature gas and/or particles released upon ignition of the pyrotechnic device 52 when inflating the airbag cushion 20 via the aperture 54. While the positioning of the seam tape 10 between the reinforcement strips 40 and the inner surface of the airbag cushion 20 along at least a portion of the seams 30, the stitching(s) that connect the fabric sections 22, 24, 26, 28 together and the associated needle puncture holes can be at least partially sealed by the melting of the polymer fibers in the seam tape 10 through the exposure to the quick flash of high temperature of the gas through the reinforcement strip.

Figure 10A:
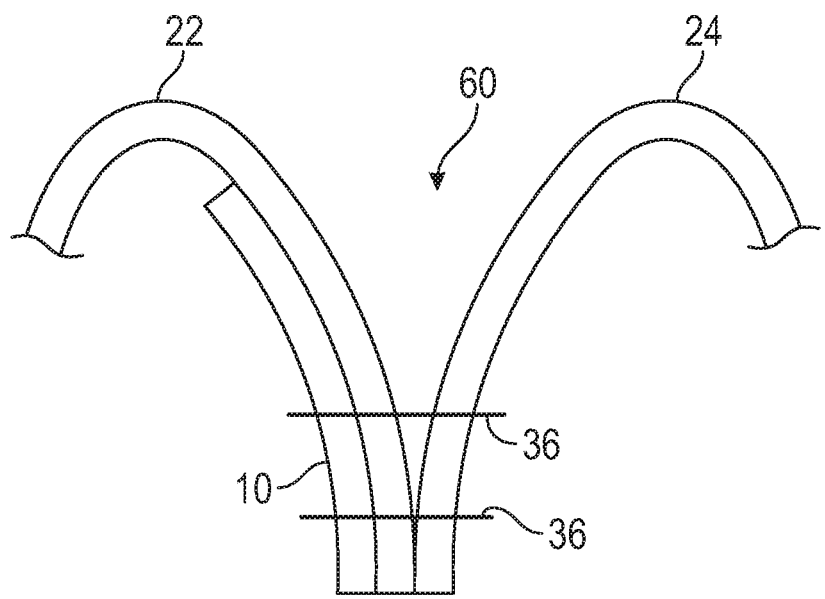
FIG. 10A illustrates a schematic cross-sectional view of an embodiment of a seam tape used along another embodiment of a seam within an airbag cushion of a vehicle safety device according to the present subject matter.
Figure 10B:
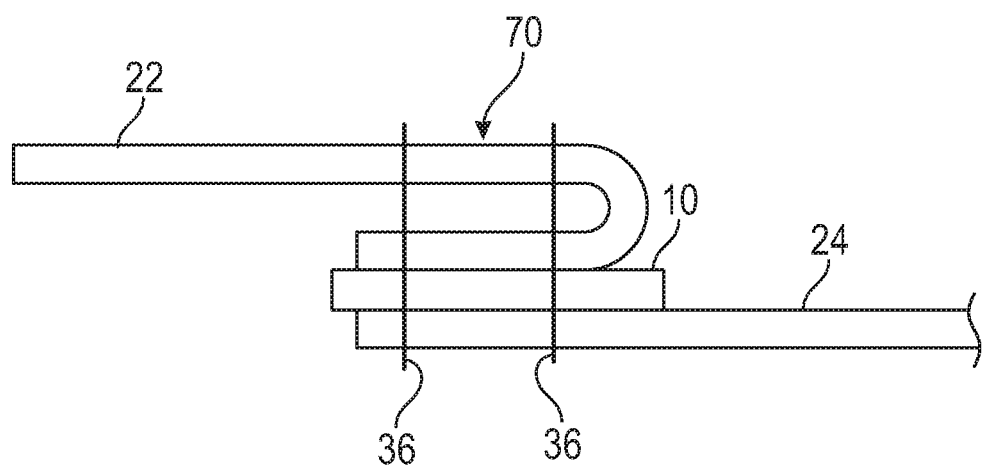
FIG. 10B illustrates a schematic cross-sectional view of an embodiment of a seam tape used along a further embodiment of a seam within an airbag cushion of a vehicle safety device according to the present subject matter.

FIGS. 10A and 10B illustrate further seam forming embodiments that use a seam tape 10 along the seam. As shown in FIG. 10A, a seam 60 is formed between a first fabric section 22 and a second fabric section 24 through sewing a double stitch 36. The seam 60 is a peal seam. The seam tape 10 can be joined to the fabric sections 22, 24 by the double stitch on the interior portion of the seam so that upon exposure to the hot inflation gas, the seam tape 10 melts and seals the voids in the fabric sections 22, 24 formed by the stitching. While not shown, a reinforcement strip may be used in conjunction with the seam tape as described above.

Similarly, a seam 70, shown in FIG. 10B, is formed between a first fabric section 22 and a second fabric section 24 through sewing a double stitch 36. The seam 70 is, a fold seam. The seam tape 10 can be joined to the fabric sections 22, 24 by the double stitch so that upon exposure to the hot inflation gas, the seam tape 10 melts and seals the voids in the fabric sections 22, 24 formed by the stitching. As with the embodiment shown in FIG. 10A, a reinforcement strip is not shown but can be used in conjunction with the seam tape as described in other embodiments above.

As disclosed herein, a method of making an airbag cushion for a vehicle safety device is also provided as described above. For example, the method can comprise providing a plurality of fabric panels that are to form body sections of an airbag cushion, one or more reinforcement strips and seam tape. The plurality of fabric panels can be aligned along seams to form an interior space and define an aperture for the airbag cushion. The one or more reinforcement strips can be positioned along the seam within the interior of the airbag and the seam tape can be positioned between the reinforcement strip and the seam of the airbag. The plurality of fabric panels, the one or more reinforcement strips and the seam tape can be joined along seams with the seam tape positioned between the reinforcement strip and the seam of the airbag.

The step of joining the plurality of fabric panels, the one or more reinforcement strips and the seam tape can be accomplished in the various ways as described above. For example, the plurality of fabric panels, the one or more reinforcement strips and the seam tape can be sewn together such that the plurality of fabric panels, the one or more reinforcement strips and the seam tape are secured together by stitches. For, example, in some embodiments, the plurality of fabric panels can be sewn along the seams together with a single stitching and reinforcement strip and the seam tape can be sewn to the fabric panels along the seams with a double stitching positioned on either side of the single stitching. In some embodiments, the plurality of fabric panels can be sewn together along the seams with a double stitching and the reinforcement strip and the seam tape can be sewn to the fabric panels along the seams with a single stitching positioned between the double stitching. In such embodiments, the seam tape comprises a width that extends beyond each stitch of the double stitching joining the plurality of fabric panels.

Other steps of the method as well as different steps of joining the components along seams are described in more detail above.

These and other modifications and variations to the present subject matter may be practiced by those of ordinary skill in the art, without departing from the spirit and scope of the present subject matter, which is more particularly set forth herein above and any appending claims. In addition, it should be understood the aspects of the various embodiments may be interchanged both in whole or in part. Furthermore, those of ordinary skill in the art will appreciate that the foregoing description is by way of example only, and is not intended to limit the present subject matter. Any reference signs incorporated in the claims are solely to ease their understanding, and do not limit the scope of the claims.

What is claimed is:

1. A vehicle safety device, comprising:
    an airbag forming an interior space and defining an aperture, the airbag comprising a first fabric section and a second fabric section, wherein the first fabric section is joined along a seam to the second fabric section;
    a pyrotechnic device positioned within working proximity to the aperture defined in the airbag, wherein the pyrotechnic device is configured to fill the interior space of the airbag with a gas upon ignition; and
    a seam tape comprising a needlepunched nonwoven material positioned in the interior surface on the seam of the airbag, the needlepunched nonwoven material configured to absorb the impingent gas shock wave of the gas generated upon ignition of the pyrotechnic device and comprising at least one polymer and being configured to melt upon exposure to the heat from the gas generated by the pyrotechnic device such that the melted polymer of the seam tape flows into and occupies needle puncture holes to reduce leakage of the gas through the needle puncture holes.

2. The vehicle safety device according to claim 1, wherein the needlepunched nonwoven material comprises thermoplastic polymer fibers comprising a denier of between about 2 and about 15.

3. The vehicle safety device according to claim 2, wherein the needlepunched nonwoven material of the seam tape is calendered using a S-type calendar machine so that a first side of the needlepunched nonwoven material of the seam tape has different surface bonding and finishing profile than a second side of the needlepunched nonwoven material of the seam tape.

4. A vehicle safety device, comprising:
    an airbag forming an interior space and defining an aperture, the airbag comprising a first fabric section and a second fabric section, wherein the first fabric section is joined along a seam to the second fabric section;
    a pyrotechnic device positioned within working proximity to the aperture defined in the airbag, wherein the pyrotechnic device is configured to fill the interior space of the airbag with a gas upon ignition;
    a reinforcement strip positioned within the interior of the airbag on the seam;
    a seam tape positioned between the reinforcement strip and the seam of the airbag, the seam tape comprising a needlepunched nonwoven material positioned in the interior surface on the seam of the airbag, the needlepunched nonwoven material configured to absorb the impingent as shock wave of the gas generated upon ignition of the pyrotechnic device and comprising at least one polymer and being configured to melt upon exposure to the heat from the gas generated by the pyrotechnic device such that the melted polymer of the seam tape flows into and occupies needle puncture holes to reduce leakage of the gas through the needle puncture holes.

5. The vehicle safety device according to claim 4, wherein the needlepunched nonwoven material comprises thermoplastic polymer fibers comprising a denier of between about 2 and about 15.

6. The vehicle safety device according to claim 5, wherein the needlepunched nonwoven material of the seam tape is calendered using a S-type calendar machine so that a first side of the needlepunched nonwoven material of the seam tape has different surface bonding and finishing profile than a second side of the needlepunched nonwoven material of the seam tape.

7. The vehicle safety according to claim 4, wherein the reinforcement strip and the seam tape are stitched to the seam along a double stitching positioned on either side of a single stitching between the first fabric section and the second fabric section.

8. The vehicle safety device as in any of the claim 4, wherein the reinforcement strip and the seam tape are stitched to the seam along a single stitching positioned between a double stitching between the first fabric section and the second fabric section.

9. The vehicle safety device according to claim 8, wherein the double stitching between the first fabric section and the second fabric section further stitches the reinforcement strip and the seam tape.

10. The vehicle safety device according to claim 8, wherein the seam tape comprises a width that extends beyond each stitch of the double stitching joining the first fabric section and the second fabric section.

11. The vehicle safety device according to claim 10, wherein a portion of the seam tape extending beyond each stitch of the double stitching between the first fabric section and the second fabric section is unsecured to either the first fabric section or the second fabric section.

12. The vehicle safety device according to claim 4, wherein the first fabric section overlaps the second fabric section to define an overlap area, the seam being located within the overlap area, and wherein the reinforcement strip and the seam tape have a width that extends beyond the overlap area.

13. The vehicle safety device according to claim 4, wherein the seam between the first fabric section and the second fabric section is formed by a single stitching.

14. The vehicle safety device according to claim 13, wherein the reinforcement strip and the seam tape are stitched to the seam along a double stitching that extends between the first fabric section, the second fabric section, the seam tape and the reinforcement strip.

15. The vehicle safety device according to claim 14, wherein the single stitching between the first fabric section and the second fabric section is positioned between the double stitches of the double stitching that extends between the first fabric section, the second fabric section, the reinforcement strip and the seam tape.

16. The vehicle safety device according to claim 4, wherein the first fabric section comprises a nylon fabric.

17. The vehicle safety device according to claim 4, wherein the second fabric section comprises a nylon fabric.

18. A method of making an airbag cushion for a vehicle safety device, the method comprising:
providing a plurality of fabric panels that are to form body sections of an airbag cushion;
providing one or more reinforcement strips;
providing a seam tape, the seam tape comprising a needlepunched nonwoven material positioned in the interior surface on the seam of the airbag, the needlepunched nonwoven material configured to absorb the impingent gas shock wave of the gas generated upon ignition of the pyrotechnic device and comprising at least one polymer and being configured to melt upon exposure to the heat from the gas generated by the pyrotechnic device such that the melted polymer of the seam tape flows into and occupies needle puncture holes to reduce leakage of the gas through the needle puncture holes;
aligning the plurality of fabric panels along seams to form an interior space and define an aperture for the airbag cushion;
positioning the one or more reinforcement strips along the seam within the interior of the airbag cushion;
positioning the seam tape between the reinforcement strip and the seam of the airbag cushion; and
joining the plurality of fabric panels, the one or more reinforcement strips and the seam tape along seams with the seam tape positioned between the reinforcement strip and the seam of the airbag.

19. The method according to claim 18, wherein the step of joining the plurality of fabric panels, the one or more reinforcement strips and the seam tape comprises sewing the plurality of fabric panels, the one or more reinforcement strips and the seam tape such that the plurality of fabric panels, the one or more reinforcement strips and the seam tape are secured together by stitches.

20. The method according to claim 18, wherein the step of joining the plurality of fabric panels, the one or more reinforcement strips and the seam tape comprises sewing along the seams comprises sewing the plurality of fabric panels along the seams together with a single stitching and sewing the reinforcement strip and the seam tape to the fabric panels along the seams with a double stitching positioned on either side of the single stitching.

21. The method according to claim 18, wherein the step of joining the plurality of fabric panels, the one or more reinforcement strips and the seam tape comprises sewing along the seams comprises sewing the plurality of fabric panels along the seams together with a double stitching and sewing the reinforcement strip and the seam tape to the fabric panels along the seams with a single stitching positioned between the double stitching.

22. The method according to claim 21, wherein the seam tape comprises a width that extends beyond each stitch of the double stitching joining the plurality of fabric panels.

23. The method according to claim 18, wherein the needlepunched nonwoven material comprises thermoplastic polymer fibers comprising a denier of between about 2 and about 15.

* * * * *